United States Patent
Baesjou et al.

(10) Patent No.: US 7,529,019 B2
(45) Date of Patent: May 5, 2009

(54) LIGHT MODULATOR

(75) Inventors: Patrick Baesjou, Eindhoven (NL);
Mark Thomas Johnson, Eindhoven (NL); Lucas Josef Maria Schlangen, Eindhoven (NL); Gerardus Henricus Rietjens, Eindhoven (NL); Marcel Rene Bohmer, Eindhoven (NL); Paulus Cornelis Duineveld, Drachten (NL)

(73) Assignee: Koninklijke Philips Electronics N.V., Einhoven (NL)

( * ) Notice: Subject to any disclaimer, the term of this patent is extended or adjusted under 35 U.S.C. 154(b) by 88 days.

(21) Appl. No.: 11/571,574

(22) PCT Filed: Jul. 4, 2005

(86) PCT No.: PCT/IB2005/052223

§ 371 (c)(1),
(2), (4) Date: Jan. 3, 2007

(87) PCT Pub. No.: WO2006/006123

PCT Pub. Date: Jan. 19, 2006

(65) Prior Publication Data

US 2008/0094688 A1    Apr. 24, 2008

(30) Foreign Application Priority Data

Jul. 9, 2004   (EP)   ................... 04103263

(51) Int. Cl.
G02B 26/00   (2006.01)
G09G 3/34    (2006.01)

(52) U.S. Cl. .................................... 359/296; 345/107
(58) Field of Classification Search ............. 359/296; 345/107; 430/32; 204/600
See application file for complete search history.

(56) References Cited

U.S. PATENT DOCUMENTS

| 6,721,083 B2 | 4/2004 | Jacobson et al. |
| 2002/0180688 A1 | 12/2002 | Drzaic et al. |
| 2003/0227665 A1 | 12/2003 | Kawai |
| 2003/0231162 A1 | 12/2003 | Kishi |
| 2004/0009442 A1 | 1/2004 | Blaauwwiekel |

FOREIGN PATENT DOCUMENTS

| WO | WO03071348 A1 | 8/2003 |
| WO | WO2004074922 A1 | 9/2004 |

Primary Examiner—William C Choi

(57) ABSTRACT

The light modulator for modulating light has a light modulating element, having a medium with a particle (6) and an optical state depending on the position of the particle (6), and a particle controller (10,11,100) being arranged to enable a movement of the particle (6) to one of the positions for modulating the light. For the light modulator to have a particle (6) which can relatively easily be moved, the particle (6) has a carrier particle (81) which contributes in operation to the ability of the particle (6) to be moved and is substantially non-contributing to the optical state, and an optical particle (86) which has an optical property for contributing to the optical state, is associated with the carrier particle (81), and has a position depending on the position of the carrier particle (81).

19 Claims, 6 Drawing Sheets

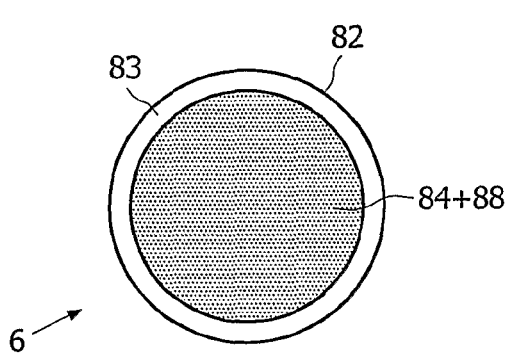
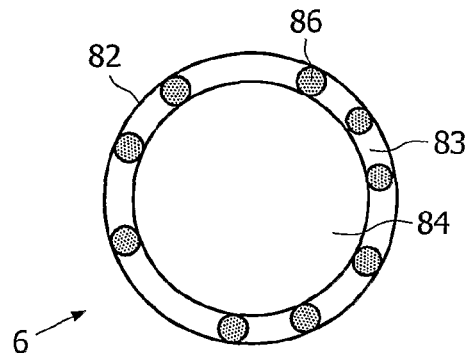
FIG. 7A    FIG. 7B
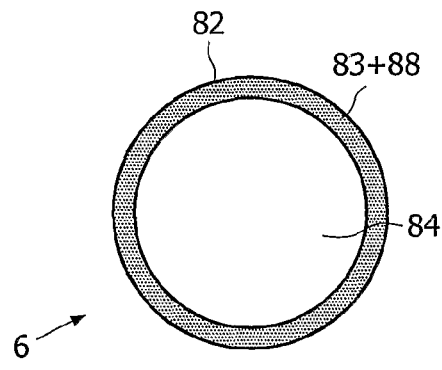
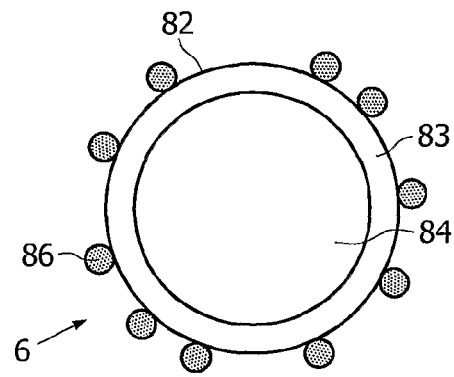
FIG. 7C    FIG. 7D
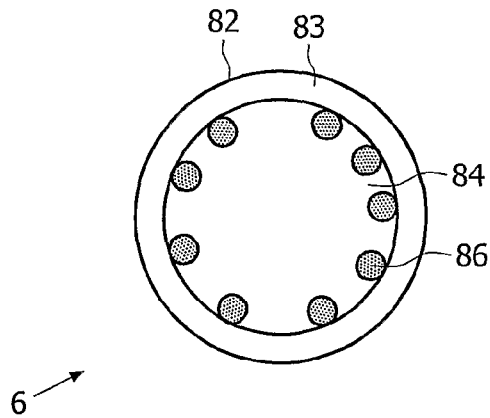
FIG. 7E

LIGHT MODULATOR

The invention relates to a light modulator for modulating light.

The invention also relates to a device comprising such a light modulator.

A light modulator for modulating light is disclosed in WO 03/071348. The disclosed light modulator is an electrophoretic display panel for generating a colored image. The panel has a pixel having an electrophoretic medium that is substantially transparent in the optical spectral range and cyan particles for absorbing red light, magenta particles for absorbing green light and yellow particles for absorbing blue light. In order for the particles to be transparent for non-absorbed wavelengths, the size of the light absorbing layers/structures in the particle should be well below the internal wavelength of light in the particle, i.e. the wavelength of the light divided by the refractive index of the particle. For this purpose small, nanometer sized, particles can be used. Alternatively a larger, porous, particle with a refractive index matched to the solvent can be used. Light absorption can then be achieved by coating the outside or/and in the pores of the particle with a dye layer that is thinner than the internal wavelength of the light. By moving the particles in/out of a visible area of the pixel by generating electric fields color absorption can be controlled at will and a picture can be displayed. However, it is difficult for the particles to be moved.

It is an object of the invention to provide a light modulator of the kind mentioned in the opening paragraph which has a particle which can relatively easily be moved.

To achieve this object, the invention provides a light modulator for modulating light comprising
a light modulating element having
a medium comprising a particle, and
an optical state depending on a position of the particle,
the particle comprising
a carrier component contributing in operation to an ability of the particle to be moved and substantially non-contributing to the optical state, and
an optical component
having an optical property for contributing to the optical state,
being associated with the carrier component, and
having a position depending on a position of the carrier component,
a particle controller being arranged to enable a movement of the particle to one of the positions for modulating the light.

As a consequence of the particle comprising a carrier component which contributes to the ability of the particle to be moved, the particle can relatively easily be moved. Furthermore, the optical state depends on the optical property of the optical component and is substantially independent of the carrier component, as the carrier component is substantially non-contributing to the optical state. As a result, the relatively large ability of the particle to be moved is independent from the optical property of the particle. This is in contrast to the display panel disclosed in WO 03/071348, where the particle does not have a carrier component contributing to the ability of the particle to be moved and where no particle is obtained having a relatively large ability to be moved which is independent from the optical property of the particle.

If the carrier component comprises a net charge or the carrier component comprises a net magnetic moment, the ability of the carrier component to be moved can relatively easily be tuned. Furthermore, if the carrier component comprises a net charge, the particle controller may comprise electrodes receiving potentials from drive means. Such kind of particle controller can easily be manufactured. Furthermore, if the carrier component comprises a net magnetic moment, the particle controller may comprise a switchable magnet, e.g. a solenoid, which can easily be manufactured. The carrier component comprising both a net charge and a net magnetic moment is also possible. It is also possible that the carrier component may become magnetized or electrically polarized during operation by the presence of the applied magnetic or electric fields. An example of the latter case is a dielectrophoretic system, where polarized particles move along directions of varying field strength under the influence of an applied AC electric field.

If the medium comprises a fluid and the refractive index of the carrier component is substantially equal to the refractive index of the fluid for being substantially non-contributing to the optical state, the carrier component can relatively easily be manufactured. Alternatively, the medium comprises a fluid and the carrier component is porous for including part of the fluid inside pores for being substantially non-contributing to the optical state. Then the number of materials to be used as carrier component is relatively large as the refractive indexes of carrier component and fluid need not match.

In an embodiment the carrier component comprises a carrier particle which is robust and may readily be fabricated. Alternatively, the carrier component comprises a fluid filled capsule. The fluid may be a liquid or gas. The wall of the capsule can comprise polymers, inorganic materials or phospholipid/surfactant (that can optionally be cross-linked).

In another embodiment the optical component is substantially non-contributing to the ability to move, for example is not on the surface.

In another embodiment the optical component comprises an optical film covering at least part of an outer surface of the carrier component. Preferably, the optical film completely covers the outer surface of the carrier component. Then the particle can relatively easily be manufactured. In a variation on the embodiment, the optical component comprises a predetermined number of optical particles, the number being at least one. Such optical particles can readily be obtained with a wide variety of colors. Preferably, each optical particle has a diameter smaller than 500 nm. If, furthermore, the optical particles are attached to an outer surface of the carrier component, then the particles of different colors can be attached to the same type of carrier particle in a straight forward manner. Alternatively, the optical particles are present in the carrier component. Then the particle becomes more robust. If the predetermined number of optical particles is at least two and a portion of the optical particles has an optical property different from an optical property of the other optical particles, then the optical property of the optical component can easily be tuned. In another variation on the embodiment, the optical component comprises a dye. Preferably, the dye is molecularly dissolved in the carrier component. Advantages are that, if the dye is dissolved, it is automatically homogenously distributed throughout the carrier particle. In the case of pigment particles such distribution is more difficult, and the pigment particles may have to be stabilized against aggregation during the fabrication of the carrier particle. Hence: ease of manufacturing. Furthermore, dye molecules are automatically non-scattering, whereas this is more difficult to achieve with pigment particles. Hence, it is much easier to achieve truly transparent carrier particles with dyes. Furthermore, with dissolved dyes, each dye molecule is optically active. In the case of pigment particles, only the surface of the pigment is optically active. Hence, it is easier to achieve the desired optical effect (better color saturation) with less use of material in the case of dyes.

In another embodiment the light modulator comprises a component for elongating the optical path, for example by introducing a forward scattering of the light.

In another embodiment, the light modulator modulates light from an external or internal light source for lighting applications, e.g. a lighting system for lighting a room or a road which has a light output which is adjustable in intensity and/or color and/or direction.

Another aspect of the invention provides a display panel for displaying a picture comprising the light modulator as claimed in claim 1. In an embodiment, the light modulating element comprises a pixel, and the particle controller is arranged to enable a movement of the particle to one of the positions for displaying the picture. In a variation on the embodiment, the display panel is an active matrix display panel.

Another aspect of the invention provides a display device comprising the display panel as claimed in claim 19 and a circuitry to provide image information to the display panel.

These and other aspects of the light modulator of the invention will be further elucidated and described with reference to the drawings, in which:

FIGS. 7A, 7B, 7C, 7D, 7E show examples of particles having fluid filled capsules as carriers for nano-particles or dyes;

In all the Figures corresponding parts are referenced to by the same reference numerals.

Figure 1:
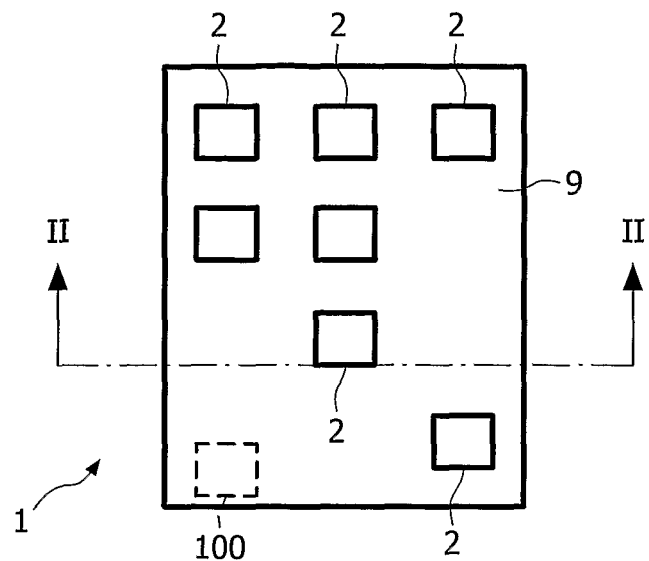
FIG. 1 shows diagrammatically a front view of an embodiment of the light modulator.
Figure 2:
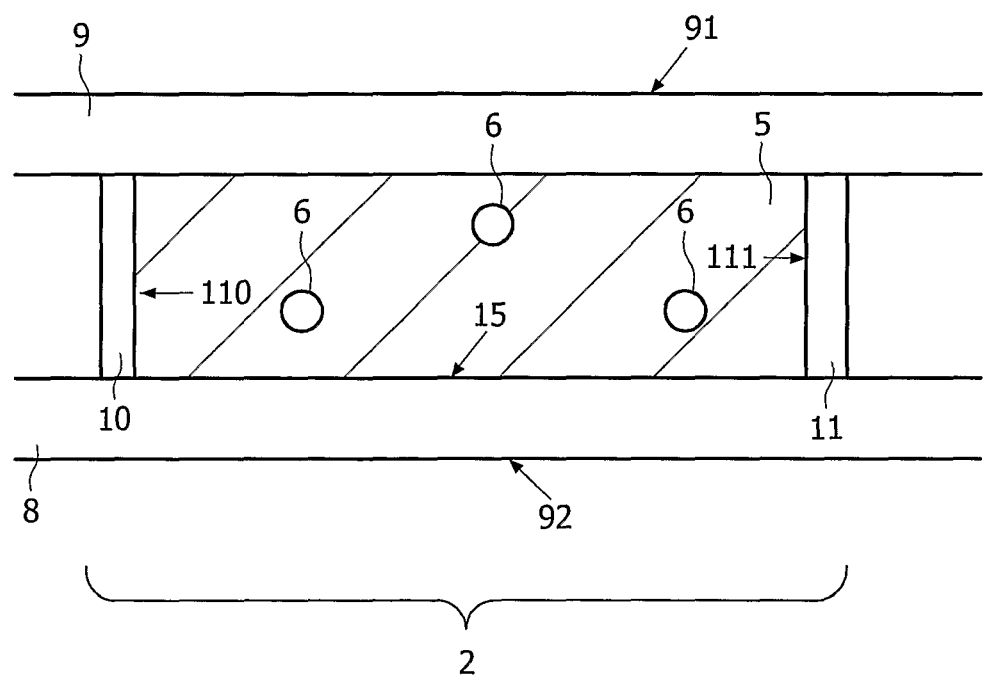
FIG. 2 shows diagrammatically a cross-sectional view along II-II in FIG. 1.

FIGS. 1 and 2 show an example of the light modulator being a display panel 1 having a first substrate 8, a second transparent opposed substrate 9 and a plurality of pixels 2. Preferably, the pixels 2 are arranged along substantially straight lines in a two-dimensional structure. Other arrangements of the pixels 2 are alternatively possible, e.g. a honeycomb arrangement. In an active matrix embodiment, the pixels 2 may further comprise switching electronics, for example, thin film transistors (TFTs), diodes, MIM devices or the like.

An electrophoretic medium 5, having first charged particles 6 in a transparent fluid, is present between the substrates 8, 9. The surface 15 of the first substrate 8 facing the second substrate 9 may be transparent, reflective or have any color.

Figure 3A:
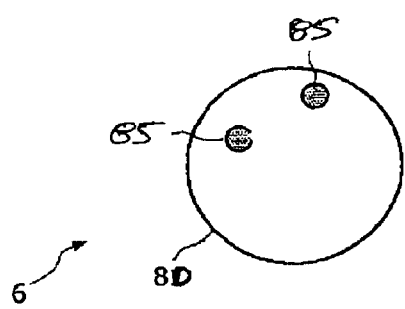
FIGS. 3A and 3B show diagrammatically exemplary carrier particles comprising carrier and optical components.
Figure 3B:
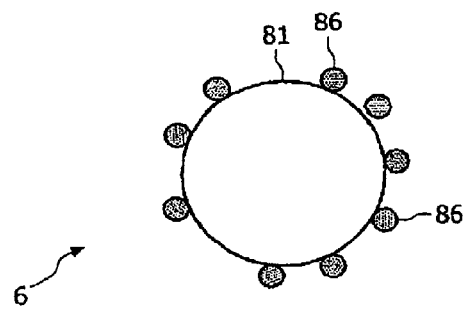

Substrate 8 may even be transparent if the panel 1 is used in light transmissive mode. Electrophoretic media 5 are known per se from e.g. US 2002/0180688. The pixel 2 has an optical state depending on the position of the particles 6. Each particle 6 has a carrier component 80 and an optical component 85. FIG. 3A, which is provided for illustrative purposes only, depicts an example of a particle 6 being comprised of a carrier component 80 and an optical component 85. The carrier component 80 contributes in operation to the ability of the particle 6 to be moved and is substantially non-contributing to the optical state. The optical component 85 has an optical property for contributing to the optical state, is associated with the carrier component 80, and has a position depending on the position of the carrier component 80. The optical component 85 may have any color, e.g. red, green, blue, cyan, magenta, yellow, white or black. The optical component 85 may be large enough to scatter light, or small enough to substantially not scatter light.

In an embodiment, the carrier component 80 of the particle 6 is a carrier particle 81 and the optical component 85 of the particle 6 has small absorbing nano-particles 86 which are distributed on the surface of the carrier particle 81. This is illustrated in FIG. 3A.

Figure 4A:
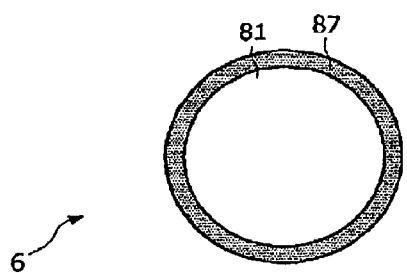
FIG. 4A shows diagrammatically a particle having a carrier particle with thin absorbing film on the surface.
Figure 4B:
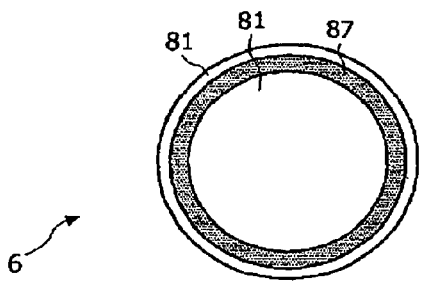
FIG. 4B shows diagrammatically a particle having a carrier particle having a thin absorbing film inside the carrier particle.

Alternatively, the optical component 85 is a thin film 87 with a thickness below the wavelength of visible light, e.g. carrier particles 81 coated with a thin film 87 of the absorbing colors, see FIG. 4A. A preferred option is to have a thin film 87 inside the carrier particle 81 (uncolored core—colored film—uncolored shell structure), see FIG. 4B. This option allows control of the charging process independently from the color absorption.

Figure 5A:
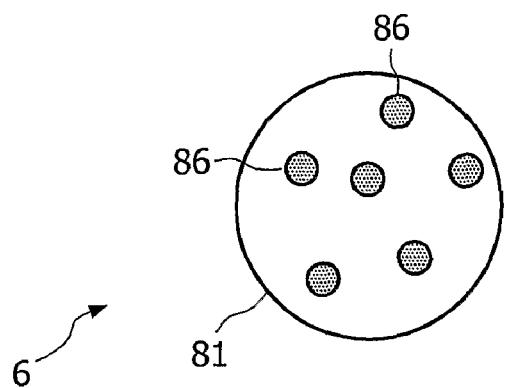
FIG. 5A shows diagrammatically a particle having a carrier particle with small absorbing nano-particles in the volume of the carrier particle.
Figure 5B:
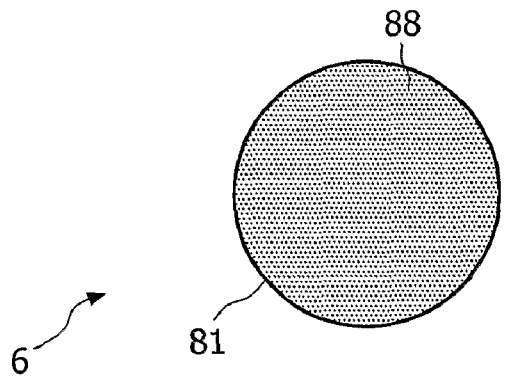
FIG. 5B shows diagrammatically a particle having a carrier particle and a dye molecularly dissolved in the matrix of the carrier particle.

In another embodiment, the optical component 85 of the particle 6 has small absorbing nano-particles 86 in the volume of the carrier particle 81. This is illustrated in FIG. 5A. This can be realized in the following system by dispersing the nano-particles 86 in the molten host material, dispersing this in droplets of a desired size followed by cooling and solidification. In this case, it is preferred if the nano-particles 86 are distributed with a separation distance sufficient to prevent unwanted optical effects, e.g. backscattering. The ultimate case of this embodiment is when a dye 88 is dissolved on the molecular level in the host matrix of the carrier particle 81, essentially affording a transparent but fully colored particle 6, as shown in FIG. 5B.

Figure 6:
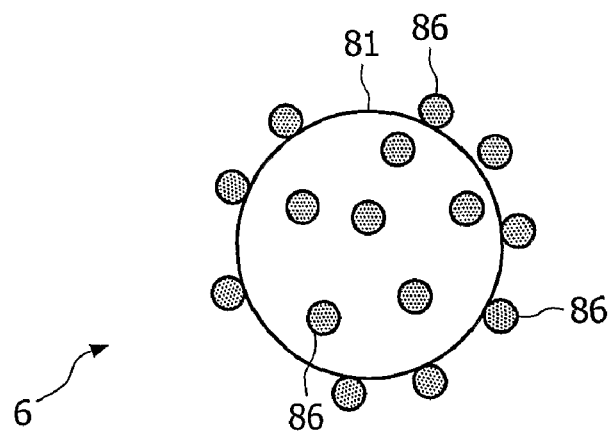
FIG. 6 shows diagrammatically a particle having a carrier particle with small absorbing nano-particles on the surface and in the volume of the carrier particle.

In another embodiment, the optical component 85 of the particle 6 has small absorbing nano-particles 86 which are distributed both on the surface and in the volume of the carrier particle 81. This is illustrated in FIG. 6. The nanoparticles on the surface may also be combined to a thin film. Other combinations are also possible, for example where the particles in the volume of the carrier have a different optical property to the particles or film on the surface.

In another embodiment the carrier component 80 is a fluid filled capsule 82. The capsule wall 83 usually consists of a polymer, inorganic material or (cross-linked) surfactant molecules (single or double layer). Other wall options are also possible. By preparing these capsules 82 in the same medium (liquid or gas) 84 that will later be used for the suspensions, they will exhibit ideal matching of specific gravity, dielectric constant and index of refraction (e.g. the capsules 82 are filled with an alkane and dispersed in the same alkane). By adding a dye 88 to the fluid 84 in which the capsules 82 are prepared, a colored yet transparent entity can be prepared (FIG. 7A). Alternatively, it is possible to embed colored nanoparticles 86 or a dye 88 in the wall of the capsule 83 (FIGS. 7B and 7C, respectively), or to attach nanoparticles 86 to the outside or inside of the wall 83 (FIGS. 7D and 7E, respectively), or combinations of these possibilities.

Whilst the particles 6 are described with a colored optical component 85, it is also possible that the surface of the carrier component 80 is coated with either a (thin) layer of a luminescent compound (nano-particle 86 or dye 88), or small dots of such a phosphor. In this manner, the efficiency of the phosphor (in the case of particles) may be increased, as the larger surface area results in a larger efficiency.

In general, in case of a charged particle 6, it is preferable to have the colored component 85 inside the carrier component 80, since this allows for free choice of the surface chemistry of the particle 6, which is a determining factor for the charge and hence the electrophoretic mobility of the particle 6.

In air small optical particles 86 can be used on the surface of larger carrier particles 81, e.g. 10 micron, to stabilize the carrier particles 81 from aggregation. This way free flowing powders can be made. In case the small optical particles 86 are colored and the larger carrier particles 81 are transparent, color displays based on in air concepts are feasible. To have good refractive index matching with the suspension medium, if it is a gas, may be done using highly porous carrier particles 81 or capsules 82.

In an alternative preparation method, emulsion procedures common in the preparation of particles 6 (in this case capsules, 82) with biodegradable polymers or lipid shells 83 are used to encapsulate an oil. In the oil dye 88 or colloidal particles 86 can be dispersed. If monodisperse particles (capsules) 6 are desired the preparation method of choice is a drop by drop technique, for instance inkjetting or filtration through a well defined membrane.

In general a solution of the shell forming polymer, such as poly-lactic acid, is made in a solvent such as dichloroethane. To this solution a solution of the dye 88 in a fluid 84, for instance oil blue N in tetradecane is added. A small amount of this solution is added to an aqueous PVA solution mechanically stirred or homogenized using other ways common in emulsion preparation.

The first mentioned solvent, has a limited solubility in water and will diffuse into the aqueous phase and subsequently evaporate. As the shell forming polymer is not soluble in the oil alone, and not in the aqueous phase, it will be forced to form a shell 83 encapsulating the oil phase 84. The particles (capsules) 6 can be collected, washed and freeze dried to remove remaining volatile solvent leaving fairly rigid spheres that can be redispersed in preferably the same oil as is present in the interior to minimize the scattering further. The refractive index of the fluid phase 84 inside and outside the particle (capsule) 6 can be matched to that of the shell 83 with a single addition.

The described procedure is effective for all colors, yielding particles (capsules) 6 with the same optical properties, except for their color.

If monodisperse capsules 6 are desired the dye 88 in fluid 84 and the polymer can be mixed and subsequently ink jetted into the PVA solution, for instance using drop on demand ink jetting where the ink jet head is submerged in a solution. By choosing polymer and oil concentration in the starting liquid the size and shell thickness can be set, giving a much better control over the synthesized particles (capsules) 6.

Figure 8:
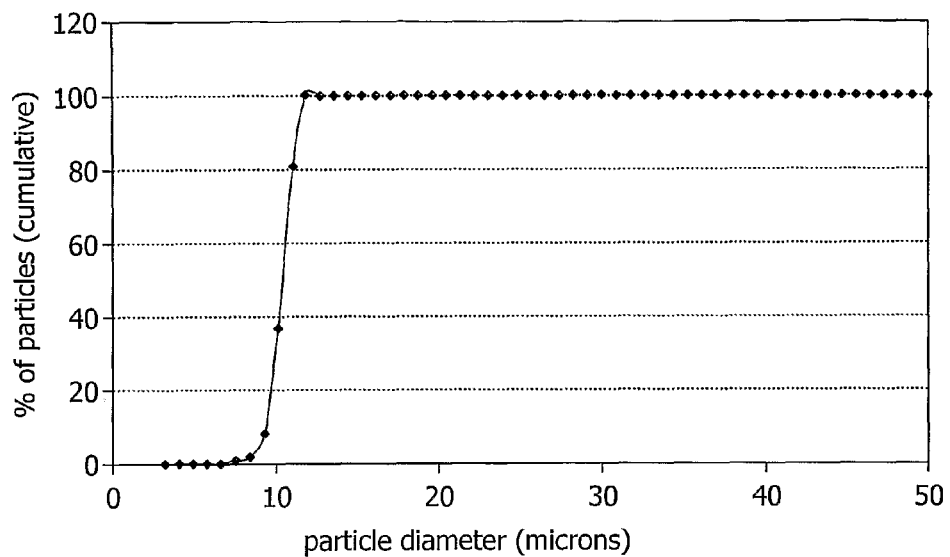
FIG. 8 shows an example of a size distribution of inkjetted particles, percentage of particle in 1 micron classes is given.
Figure 9:
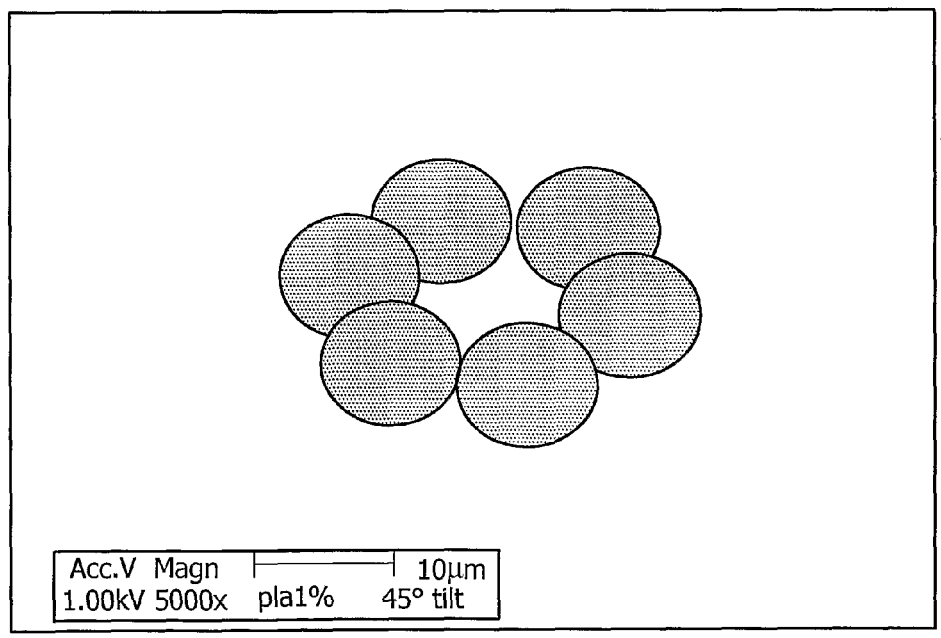
FIG. 9 shows an example of a SEM picture of PLA particles.

As an example, the preparation of 10 micron PLA particles 6 is described: A 1% PLA (poly-DL-lactide, Aldrich) solution in dichloroethane was inkjetted, starting immediately after immersion of the ink jet head into an aqueous 1% PVA (15/79) solution in a fluorescence cuvet. The initial drop diameter is about 50 micron as observed through the cuvet which corresponds to a drop volume of $6.5*10^{-14}$ m$^3$. After inkjetting for 20 minutes at 1500 Hz, the procedure was stopped. The sediment was redispersed and transferred to a glass sample bottle and stirred for one hour to remove the dichloroethane. The particles were washed 3 times with filtered (200 nm), deionised water. A sample was taken for microscopic examination, revealing well dispersed spherical particles with a diameter of about 10 micron. The size distribution of the mean diameter is given in FIG. 8. The sample was freeze dried for 48 hours and stored at $-20°$ C. SEM pictures, taken after redispersion in filtered deionised water, drying and deposition of a 3 nm Pd/Pt layer, show a particle size of 10.2±0.3 micron which corresponds to a particle volume of $5.6*10^{-16}$ m$^3$. As the densities of dichloroethane and PLA are approximately equal, the volume ratio between initial and final size demonstrates that PLA particles have been prepared with a low porosity. A SEM picture of the particles produced is given in FIG. 9.

As another example, the preparation of 18 micron PLA particles by continuous inkjet is described:

The 1% solution of PLA in dichloroethane was purged at 3 m/s through a 50 micron capillary in a 1% PVA solution, subjected to a piezo frequency of 14 kHz, which causes the jet to break up in droplet with a diameter of about 65 micron. Dichloroethane was removed by stirring for 4 hours and the excess PVA was removed by repeated washing. The particle size distribution is bimodal. The fraction of fines was largely removed by four sedimentation steps. Particles with a narrow size distribution were formed.

As another example, the preparation of oil and dye filled capsules is described: A solution of oil blue N in tetradecane was made and mixed with a 0.5% solution of PLGA (poly-lactic-co-glycolic acid) in dichloroethane. This solution was added to a 1% PVA solution in water and subjected to stirring for 1 hour. Remaining dichloroethane was removed by slowly stirring for another 4 hours and the excess PVA was removed by three washing steps. Dye containing capsules were formed.

Referring to the display panel 1 of FIGS. 1 and 2 the particles 6 are able to occupy positions in the pixel 2. The pixel 2 has a viewing surface 91 for being viewed by a viewer. The optical state of a pixel 2 depends on the position of the particles 6 in the pixel 2.

In transmissive mode, the optical state of the pixel 2 is determined by the portion of the visible spectrum incident on the pixel 2 at the side 92 of the first substrate 8 that survives the cumulative effect of traversing through the first substrate 8, medium 5 and the second substrate 9. In reflective mode, the optical state of the pixel 2 is determined by the portion of the visible spectrum incident on the pixel 2 at the side of the second substrate 9 that survives the cumulative effect of traversing through the second substrate 9, medium 5, subsequently interacting with surface 15 of the first substrate 8 which may be reflective or have any color and subsequently traversing back through medium 5 and the second substrate 9.

The amount and color of the light transmitted by medium 5 is controlled by the position and the color of the particles 6. When the particles are positioned in the path of the light that enters the pixel, the particles absorb or scatter a selected portion of the light and the remaining light is transmitted. When the particles are substantially removed from the path of the light entering the pixel, the light can pass through the pixel and emerge without significant visible change. The light seen by the viewer, therefore, depends on the distribution of particles 6 in the pixel.

The particle controller having electrodes 10,11 for receiving potentials from drive means 100 is arranged to enable a movement of the particles 6 to one of the positions for displaying the picture. In this case, each one of the electrodes 10,11 has a substantially flat surface 110,111 facing the particles 6. As a result, a substantially homogeneous electric fields can be generated between the electrodes 10,11.

In an example, consider the particles 6 to be positively charged and black. Furthermore, the fluid is transparent. Consider the pixel layout of FIG. 2 and the display panel being used in light transmissive mode. The optical state of the pixel 2 is determined by the portion of the visible spectrum incident on the pixel 2 at the entrance window 92 that survives the cumulative effect of traversing through the first substrate 8, medium 5 and the second substrate 9 and exits through exit window 91. Consider white light e.g. generated by a (back) light source (not drawn), incident on the entrance window 92. To obtain an optical state being black the particles 6 are brought in their distributed state in the pixel 2 by appropriately changing the potentials received by the electrodes 10,11. As the white light from the light source incident on the pixel 2 is absorbed by the black particles 6, the optical state of the pixel 2 is black.

To obtain an optical state being white the particles 6 are brought in their collected state near the surface of electrode 10 or 11, by appropriately changing the potentials received by the electrodes 10,11. The movement of the particles 6 has a component in the plane parallel to the exit window 91 and the particles 6 are brought substantially outside the light path. Therefore, the white light from the light source is transmitted through the pixel 2 and the optical state of the pixel 2 is white.

Intermediate optical states are also possible by appropriately changing the potentials received by the electrodes 10,11. In an example, only a small number of particles 6 are distributed in the pixel 2 thereby not fully absorbing the white light from the light source incident on the pixel 2, which results in an optical state being intermediate between black and white. Further colored optical states can be realized by adding a passive color changing component to the optical system (color filter element, colored liquid, colored reflector etc.).

Figure 10:
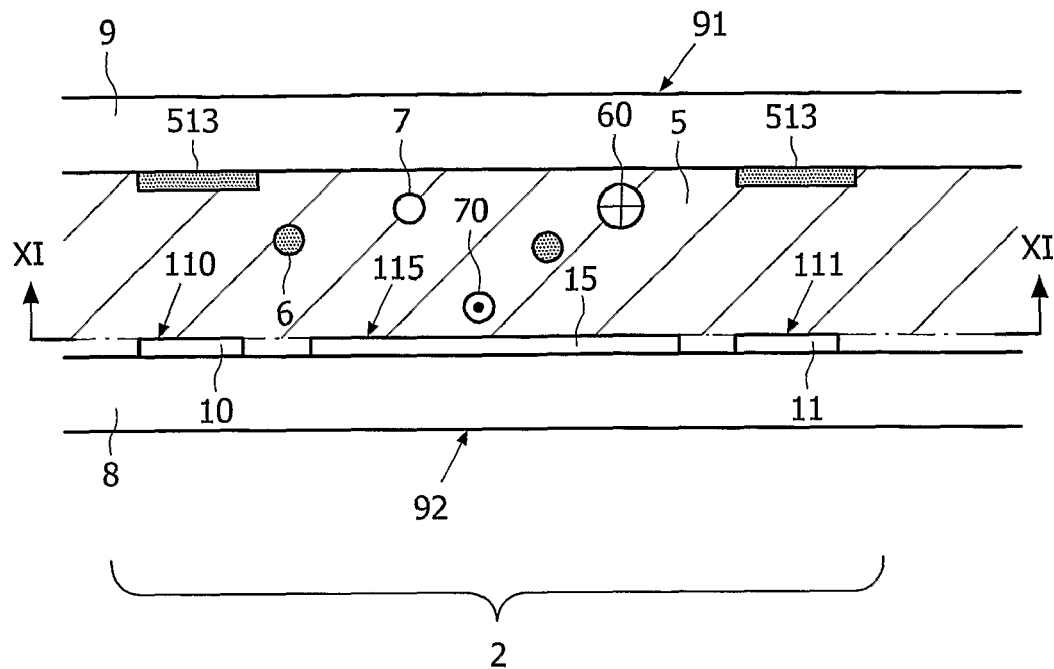
FIG. 10 shows diagrammatically a cross-sectional view along II-II in FIG. 1 of another embodiment of the light modulator.
Figure 11:
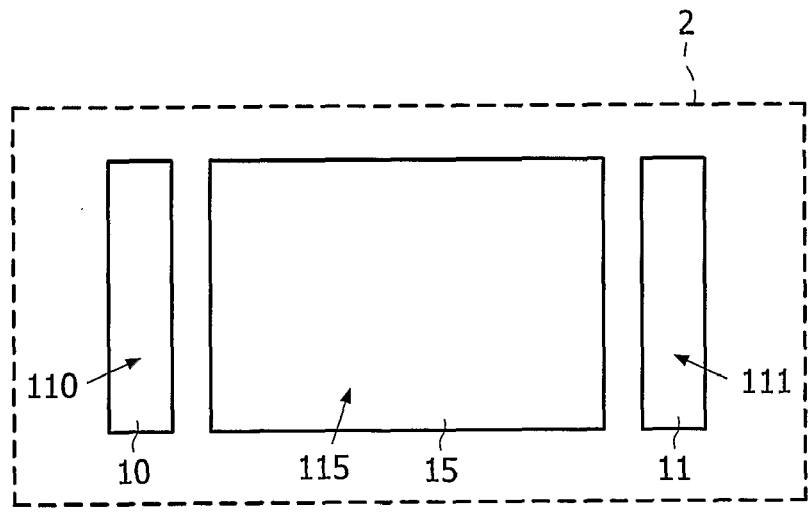
FIG. 11 shows diagrammatically a cross-sectional view along XI-XI in FIG. 10.

FIGS. 10 and 11 show another embodiment of the display panel 1. The electrophoretic medium 5 has first, second, third and fourth charged particles 6,7,60,70 in a transparent fluid. Each one of the particles 6,7,60,70 has a carrier component 80 and an optical component 85, respectively. The optical components 85 are small absorbing nano-particles 86. Consider the first particles 6 to be positively charged, magnetic and to have a yellow color in transmission, the second particles 7 to be positively charged, non-magnetic and to have a cyan color in transmission, the third particles 60 to be negatively charged, magnetic and to have a magenta color in transmission, and the fourth particles 70 to be negatively charged, non-magnetic and to have a black color. Furthermore, each one of the electrodes 10,11,15 has a substantially flat surface 110,111,115 facing the particles 6,7,60,70 and the viewing surface 91. Furthermore, the surfaces 110,111,115 of the electrodes 10,11,15 are present in a substantially flat plane. The region near the surface 110 of electrode 10 provides a first reservoir for the yellow and cyan particles 6,7 and is substantially non-contributing to the optical state of the pixel 2. This is achieved by a black matrix layer 513 between electrode 10 and the observer. The region near the surface 111 of electrode 11 provides a second reservoir for the magenta and black particles 60,70 and is substantially non-contributing to the optical state of the pixel 2. This is also achieved by a black matrix layer 513 between electrode 11 and the observer. The position of the particles 6,7,60,70 and the surface 115 of electrode 15 determine the optical state of the pixel 2. Consider the surface 115 of electrode 15 to be white. The three electrodes 10,11,15 each incorporate a magnetic sheet, preferably with a vertical anisotropy (a Co/Pt or Co/Cr multilayer magnet would be a good electrode material). This has the effect of creating an extra force for holding the magnetic particles on the electrodes. In this embodiment the display panel 1 is used in light reflective mode.

It is furthermore assumed that if an electric field is created between the central electrode 15 and one of the side-electrodes 10,11 that the electric field created with a potential of ±5 Volts is sufficient to displace only the nonmagnetic particles from the electrodes and that an electric field created with ±10 Volts is sufficient to displace both nonmagnetic and magnetic particles i.e. this electric field creates sufficient electrostatic force to outweigh the magnetic attraction between magnetic particles and the magnetic electrode.

The process of obtaining different colors is now considered. The first action before displaying a new color is to reset the pixel 2: the yellow and the cyan particles 6,7 are brought into the first reservoir and the magenta and the black particles 60,70 are brought into the second reservoir, by appropriately changing the potentials received by the electrodes 10,11,15, e.g. the electrodes 10,11,15 receive −10 Volts, 10 Volts and 0 Volts, respectively. The positively charged particles 6,7 are attracted towards side electrode 10 whereas the negatively charged particles 60,70 are attracted towards side electrode 11, independent of magnetic properties.

Obtaining a color associated with one of the non-magnetic particles 7,70 is the most simple and is now described. To obtain an optical state being cyan the potential of the central electrode 115 is switched to −5 Volts and the electrode 10 from which cyan has to be attracted is set to 0 Volts. At the same time the opposite side-electrode 11 (from which no particles are required) is set to the central electrode potential of −5 Volts. Due to the magnetic attraction between the side-electrodes 10,11 and the magnetic particles 6,60, respectively, the electric field is insufficient to switch either the yellow or magenta particles 6,60.

To obtain an optical state being black the potential of the central electrode 115 is switched to 5 Volts and the electrode 11 from which black has to be attracted is set to 0 Volts. At the same time the opposite side-electrode 10 (from which no particles are required) is set to the central electrode potential of 5 Volts. Due to the magnetic attraction between the side-electrodes 10,11 and the magnetic particles 6,60, respectively the electric field is insufficient to switch either the yellow or magenta particles 6,60.

In order to obtain a color associated with one of the magnetic particles 6,60 a slightly more complicated driving scheme is required. To obtain an optical state being yellow, the central electrode 15 receives a potential of −10 Volts. The side-electrode 10 from where the yellow particles 6 are sourced is held at 0 Volts and the other side-electrode 11 has the same potential as the central electrode, being −10 Volts. This creates an electric field that is sufficient to switch both the magnetic yellow and the nonmagnetic cyan particles 6,7 to the central electrode 15. This results in a pixel with a green color. In a following step, the electrodes 10,11,15 receive potentials of −5 Volts, 0 Volts and 0 Volts. By doing this the non magnetic cyan particles 7 are returned to the side electrode 10 leaving the magnetic yellow particles 6 on the central electrode 15.

To obtain an optical state being magenta, the central electrode 15 receives a potential of 10 Volts. The side-electrode 11 from where the magenta particles 60 are sourced is held at 0 Volts and the other side-electrode 10 has the same potential as the central electrode, being 10 Volts. This creates an electric field that is sufficient to switch both the magnetic magenta and the nonmagnetic black particles 60,70 to the central electrode 15. Then the electrodes 10,11,15 receive potentials of 0 Volts, 5 Volts and 0 Volts. By doing this the non magnetic black particles 70 are returned to the side electrode 11 leaving the magnetic magenta particles 60 on the central electrode 15.

Furthermore, the optical state of the pixel is green when only the yellow and cyan particles 6,7 are on the central electrode 15; the optical state of the pixel is blue when only the cyan and magenta particles 7,60 are on the central electrode 15; the optical state of the pixel is red when only the yellow and magenta particles 7,60 are on the central electrode 15, and the optical state of the pixel is white when no particles 6,7,60,70 are on the central electrode 15. In this way a 4 particle electrophoretic pixel 2 is envisaged with a magnetic sorting mechanism. Different intensity levels can be obtained by tuning the values of the potentials applied to the electrodes 10,11,15.

The mere fact that certain measures are mentioned in different claims does not indicate that a combination of these measures cannot be used to advantage.

The invention claimed is:

1. A light modulator for modulating light comprising a light modulating element having
    a medium comprising a particle, and an optical state depending on a position of the particle, the particle comprising:
        a carrier component contributing in operation to an ability of the particle to be moved and substantially non-contributing to the optical state, and
        an optical component having an optical property for contributing to the optical state, being associated with the carrier component, and having a position depending on a position of the carrier component,
    a particle controller being arranged to enable a movement of the particle to one of the positions for modulating the light; and,
    wherein that the optical component comprises an optical film covering at least part of an outer surface of the particle.

2. A light modulator as claimed in claim 1 characterized in that the carrier component comprises a net charge.

3. A light modulator as claimed in claim 1 characterized in that the carrier component comprises a net magnetic moment.

4. A light modulator as claimed in claim 1 characterized in that the medium comprises a fluid and the carrier component is porous for including part of the fluid inside pores for being substantially non-contributing to the optical state.

5. A light modulator as claimed in claim 1 characterized in that the carrier component comprises a carrier particle.

6. A light modulator as claimed in claim 1 characterized in that the carrier component comprises a fluid filled capsule.

7. A light modulator as claimed in claim 1 characterized in that the optical component is substantially non-contributing to the ability to move.

8. A light modulator as claimed in claim 1 characterized in that the optical film completely covers the outer surface of the particle.

9. A light modulator as claimed in claim 1 characterized in that the optical component comprises a dye.

10. A light modulator as claimed in claim 9 characterized in that the dye is molecularly dissolved in the carrier component.

11. A light modulator as claimed in claim 1 characterized in that the light modulator comprises a component for elongating the optical path.

12. A display panel for displaying a picture comprising the light modulator as claimed in claim 1.

13. A display device comprising the display panel as claimed in claim 12 and a circuitry to provide image information to the display panel.

14. A light modulator for modulating light comprising a light modulating element having
    a medium comprising a particle, and an optical state depending on a position of the particle, the particle comprising:
        a carrier component contributing in operation to an ability of the particle to be moved and substantially non-contributing to the optical state, and
        an optical component having an optical property for contributing to the optical state, being associated with the carrier component, and having a position depending on a position of the carrier component,
    a particle controller being arranged to enable a movement of the particle to one of the positions for modulating the light; and,
    wherein the medium comprises a fluid and the refractive index of the carrier component is substantially equal to the refractive index of the fluid for being substantially non-contributing to the optical state.

15. A light modulator for modulating light comprising a light modulating element having
    a medium comprising a particle, and an optical state depending on a position of the particle, the particle comprising:
        a carrier component contributing in operation to an ability of the particle to be moved and substantially non-contributing to the optical state, and
        an optical component having an optical property for contributing to the optical state, being associated with the carrier component, and having a position depending on a position of the carrier component,
    a particle controller being arranged to enable a movement of the particle to one of the positions for modulating the light; and,
    wherein the optical component comprises a predetermined number of optical particles, the number being at least one.

16. A light modulator as claimed in claim 15 characterized in that each optical particle has a diameter smaller than 500 nm.

17. A light modulator as claimed in claim 15 characterized in that the optical particles are attached to an outer surface of the carrier component.

18. A light modulator as claimed in claim 15 characterized in that the optical particles are present in the carrier component.

19. A light modulator as claimed in claim 15 characterized in that the predetermined number of optical particles is at least two and a portion of the optical particles has an optical property different from an optical property of the other optical particles.

* * * * *